United States Patent
Vogel

[11] 3,775,739
[45] Nov. 27, 1973

[54] METHOD AND APPARATUS FOR DETECTING FRACTURES

[75] Inventor: Charles B. Vogel, Houston, Tex.

[73] Assignee: Shell Oil Company, New York, N.Y.

[22] Filed: Jan. 20, 1971

[21] Appl. No.: 107,961

Related U.S. Application Data

[63] Continuation-in-part of Ser. No. 520,021, Dec. 13, 1965, Pat. No. 3,585,580, which is a continuation-in-part of Ser. No. 128,167, July 31, 1961, abandoned.

[52] U.S. Cl.... 340/18 R, 181/0.5 BE, 340/15.5 SW
[51] Int. Cl................................................ G01v 1/40
[58] Field of Search .................. 340/18 R, 15.5 SW; 181/0.5 BE

[56] References Cited
UNITED STATES PATENTS

| | | | |
|---|---|---|---|
| 3,182,286 | 5/1965 | Zimmerman et al.............. | 340/18 R |
| 3,406,776 | 10/1968 | Henry ............................... | 340/18 R |
| 3,333,238 | 7/1967 | Caldwell ........................... | 340/18 R |
| 3,216,524 | 11/1965 | Summers........................... | 340/18 R |
| 2,963,641 | 12/1960 | Nanz.................................. | 324/13 |
| 3,363,719 | 1/1968 | Venghiattis ...................... | 340/18 R |
| 3,312,934 | 4/1967 | Stripling et al.................... | 340/18 R |
| 3,356,177 | 12/1967 | Loren .............................. | 181/0.5 BE |

FOREIGN PATENTS OR APPLICATIONS

| | | | |
|---|---|---|---|
| 1,141,245 | 12/1962 | Germany.......................... | 340/18 R |

*Primary Examiner*—Benjamin A. Borchelt
*Assistant Examiner*—H. A. Birmiel
*Attorney*—Theodore E. Bieber and Harold L. Denkler

[57] ABSTRACT

A method and apparatus for detecting vertically extending fractures in formations penetrated by a borehole, wherein a probing instrument having ultrasonic transmitting and receiving transducers is lowered into the borehole. The transducers are mounted in pads that are urged into contact with the wall of the borehole. The transducers are positioned and energized to generate and receive both longitudinal and transverse waves that travel circumferentially around the borehole. The presence of a vertical fracture is indicated by a reduction in the amplitude of the received transverse wave without a corresponding reduction in the amplitude of the longitudinal wave.

10 Claims, 6 Drawing Figures

PATENTED NOV 27 1973 3,775,739

C. B. Vogel
INVENTOR

C. B. Vogel
INVENTOR

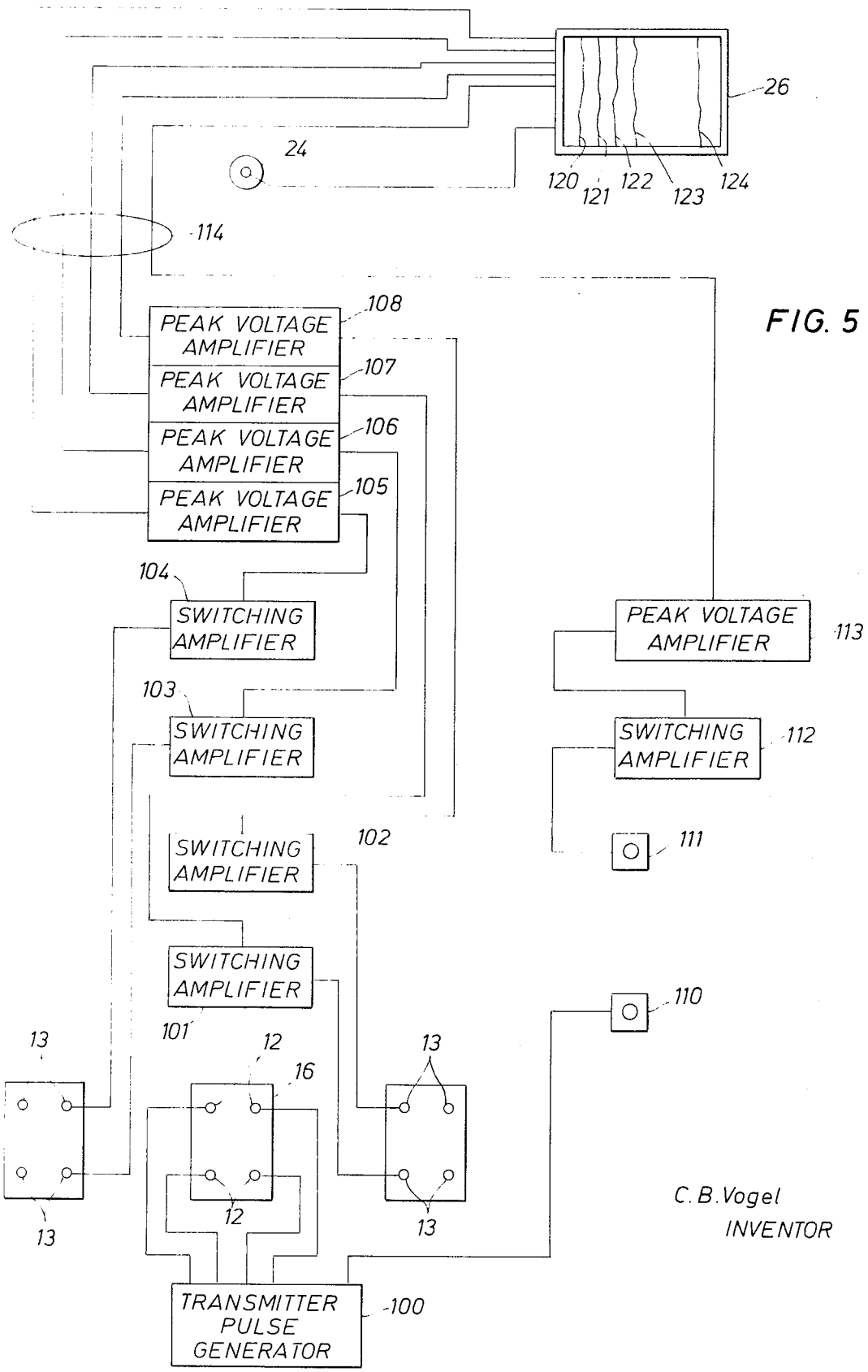

METHOD AND APPARATUS FOR DETECTING FRACTURES

CROSS-REFERENCE TO RELATED APPLICATIONS

This application is a continuation-in-part of a copending application Ser. No. 520,021 filed Dec. 13, 1965, now U.S. Pat. No. 3,585,580, which in turn is a continuation in part of application Ser. No. 128 167, filed July 31, 1961, now abandoned.

BACKGROUND OF THE INVENTION

At the present time it is the practice in the art of acoustical well logging to measure the longitudinal or compressional wave velocity of acoustical waves over intervals of a few feet. Moreover, experiments have shown that the porosity, density and fluid content of rocks are related to the amplitude of acoustic compressional waves transmitted or refracted therethrough and to the attenuation with distance of said amplitude. These rock properties have been found also related to the velocity, amplitude, and attenuation of transverse waves propagated through rock formations. For most purposes, measurements over intervals of one of a few feet are satisfactory since they provide information relating to the average properties of the formation surrounding the borehole. In some cases the earth formations are very inhomogeneous and the acoustical logging over distances of a few feet do not give sufficient information to accurately characterize the formation in question. As an example, in vuggy carbonate formations the average value of porosity over a thickness of a foot or more may be on the order of 1 percent while the discrete value of porosity over distances of a few inches may be as high as 10 percent. In such a case the discrete value of porosity is important is determining the amount of hydrocarbons which may be present in the formation and whether it is likely to be producible. In other cases the formation may comprise very thin alternating shale and sand beds which may not be detected as separate layers by conventional logging methods, thus giving rise to erroneous interpretations as to the presence of entrapped hydrocarbons.

Since either longitudinal or transverse waves may be propagated over a specified measurement interval and since additionally one may specify any of many directions of propagation for the waves transmitted and received, there are numerous acoustical transmission properties associated with any one kind of surrounding material.

Assuming that the only directions of interest are horizontal and vertical, and acoustical transmission properties associated with a given kind of surrounding material and with a specified length of measuring interval may be listed thus: vertical transmission properties comprising: longitudinal wave velocity, vertical propagation; longitudinal wave amplitude, vertical propagation; longitudinal wave attenuation with distance, vertical propagation; transverse wave velocity, vertical propagation; transverse wave amplitude, vertical propagation; transverse wave attenuation with distance, vertical propagation; horizontal transmission properties comprising: longitudinal wave velocity, horizontal propagation; longitudinal wave amplitude, horizontal propagation; longitudinal wave attenuation with distance, horizontal propagation; transverse wave velocity, horizontal propagation transverse wave amplitude, horizontal propagation; transverse wave attenuation with distance, horizontal propagation.

As pointed out in the copending application above referenced, for some purposes it is useful to measure acoustical transmission properties of materials with the measurement interval very short so that it is possible to resolve property variations extending over very small regions. One example is where one desires to detect the presence of very thin horizontal beds, or small vertical openings of hairline dimensions in the surrounding material such as an elongated opening as might occur in the cement surrounding a well casing or in an uncased formation having thin open vertical fractures. In the above-referenced copending application it is shown how this kind of detection may be achieved by means of a logging tool which measures horizontal transmission properties along contiguous or overlapping horizontal intervals extending around the inner wall of the opening.

While the copending application discloses the use of contiguous intervals for detecting vertical openings in formation, some problems remain. For example, the method does not conveniently distinguish between a reduction in amplitude caused by gas cut mud and a similar reduction caused by a vertical opening. Similar results are produced when the pad holding the transducers is not pressed firmly against the formation.

SUMMARY OF THE INVENTION

The present invention solves the above problems by propagating around the circumference of the borehole high frequency transverse waves and measuring the amplitude of the received waves at separate receivers. The waves are propagated in the form of contiguous or overlapping intervals so that substantially the complete circumference of the borehole is surveyed. Simultaneously with the propagation of transverse waves corresponding compressional waves are propagated around the circumference and measurements made of the amplitude of the compressional waves received. Simultaneously, there is made a measurement of the amplitude of compressional waves in the fluid filling the borehole.

The above measurements are recorded in a correlatable manner, preferably in a side-by-side relationship. From the recorded measurements one can determine whether a reduction in the amplitude of the received waves was caused by a vertical fracture, an enlarged section, or gas cut mud in the borehole. In the case of a fracture, the amplitude of the transverse waves will be substantially reduced while the received compressional wave will be reduced to a smaller degree. In the case of an enlarged section of a borehole the amplitude of both the compressional and transverse waves will be reduced. A similar reduction will occur in both the transverse and compressional waves when gas cut mud is present in the borehole.

The invention uses a downhole tool having a plurality of transmitting and receiving transducers and a biasing means for urging the transducers into contact with or close proximity to the formation. Preferably the tool uses four transmitting and four receiving transducers for generating, propagating and receiving transverse waves and a similar number for generating, propagating and receiving compressional waves. The downhole tool is moved through the borehole to measure the changes in the acoustical transmission characteristic for the interval between the transducers. The transmitting transducers are designed and energized to generate acoustical wave trains having frequencies of 50 kilocycles or more and preferably greater than 100 kilocycles. Similarly, the receiving transducer is arranged to respond predominantly only to frequencies of 50 kilocycles or more. Furthermore, the transmitter receiver transducer configuration is made highly directional to respond preferentially to waves traveling in the formation and to waves propagating therein with velocities within a preselected range. The direction of maximum response of the transducers is inclined at an angle less than 90° from the normal to the borehole wall and preferably about 10° to 30° from said normal. These are important features of this invention since they allow the transducers or the necessary transducer holders to rub against the formations as the downhole tool is moved through the formations without interfering with the operation of the system. The frequency of the noise generated by the movement and rubbing of the downhold tool through the formation is well below the 50 kilocycle or higher frequency used in the instrument. Since the interval over which acoustic transmission is measured is short and the transducers are held in contact with or closely adjacent to the formation, the transmitted or refracted high frequency acoustical energy will vary in response to even very thin vertical fractures, whereas these thin fluid-filled fractures might be undetected by conventional methods.

BRIEF DESCRIPTION OF THE DRAWINGS

The above objects and advantages will be more easily understood from the following detailed description of a preferred embodiment when taken in conjunction with the attached drawings in which:

FIG. 5 is a well logging system of FIG. 1 with the required electronic circuits shown in block diagram form.

Referring now to FIG. 1, there is shown a downhole logging tool 11 which is suspended in a borehole 10 at the end of a multi-conductor cable 23. The downhole logging tool has a transmitting transducer as at 12 and 13. Preferably four transmitting or four receiving transducers are mounted in each pad 16, though only two are shown in FIG. 1. The transmitting and receiving transducers may have substantially the same construction and may be of the piezo electric type. In addition, both transmitting and receiving transducers should operate at 50 kilohertz or more and preferably at a frequency higher than 100 kHz in order that the transmitter will generate acoustical impulses having a frequency of at least 50 kilohertz and the receiver will discriminate against impulses below 50 kilohertz. Furthermore, the receiving and transmitting transducers have the required directionality for maximum response as described below with reference to FIG. 2. All the transmitting transducers 12 and 13 plus receiving transducers are mounted in pads or shoes 16, only two of which are shown in FIG. 1. The tool utilizes four pads 16 equally spaced around the circumference of the borehole, each containing four transducers with diametrically opposite pads containing the same type of transducers. For example, the two pads shown in FIG. 1 could each contain four transmitting transducers, while the two pads not shown could each contain four receiving transducers. Further, the lower transducers 12 can be disposed to generate substantially transverse waves in the formation while the upper transducers 13 are disposed to generate substantially longitudinal or compressional waves. Of course the two pads not shown would have their receiving transducers disposed to respond primarily to the type of waves propagated by their associated transmitting transducers. The required electrical circuits for the transmitting transducers 12 and 13 are carried in a housing 14 at the end of the logging instrument while the required electrical circuits for the receiving transducers are carried in a housing 15 at the upper end of the instrument. The instrument housings 14 and 15 are mounted on the ends of a supporting rod 20 which also serves to maintain them in a spaced relationship. Each pad 16 is mounted on a bow spring 17 at the center thereof with the ends of the spring secured to separate collars 18. The two collars 18 are disposed for sliding movement along the rod 20 which supports the two housings 14 and 15 together. The second pad 16 shown in FIG. 1 is mounted on a second bow spring 17 whose ends are attached to the two collars 18 diametrically opposite the ends of the first bow spring 17.

Figure 1:
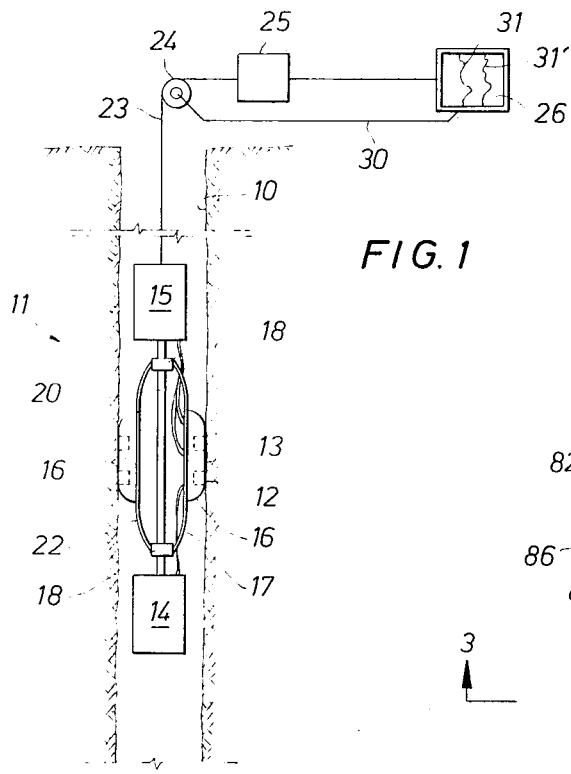
FIG. 1 shows an acoustical well logging system utilizing this invention.

From the above description it is easily seen that a logging instrument has been provided in which transducers are mounted in pads which are biased into contact with or close proximity to the wall of the borehole 10. This contact is insured by mounting the four pads 16 and associacated springs diametrically opposite each other. The instrument also provides suitable housings for the electrical circuits required for energizing the transmitting transducers and transmitting signals derived from the receiving transducers to the surface over the conductors contained in the cable 23.

The cable 23 passes over a measuring sheave 24 at the surface which preferably includes a selsyn-type unit. Thus, the position of the instrument 11 within the borehole 10 may be determined. The cable 23 is connected to a suitable electrical circuit 25 which converts the signals derived from the receiving transducers to related electrical analog signals. The electrical analog signals are functions of the amplitudes of transmission properties of the formation between the transducers. The electrical analog signals are recorded on a strip chart recorder, an oscilloscope, or other suitable device 25 and may appear as recordings 31 and 31A thereon. The selsyn unit in the measuring sheave 24 is coupled to the recorder 26 by a conductor cable 30 in order that the chart record of the recorder will be advanced in direct proportion to the position of the instrument within the borehole.

Figure 2:
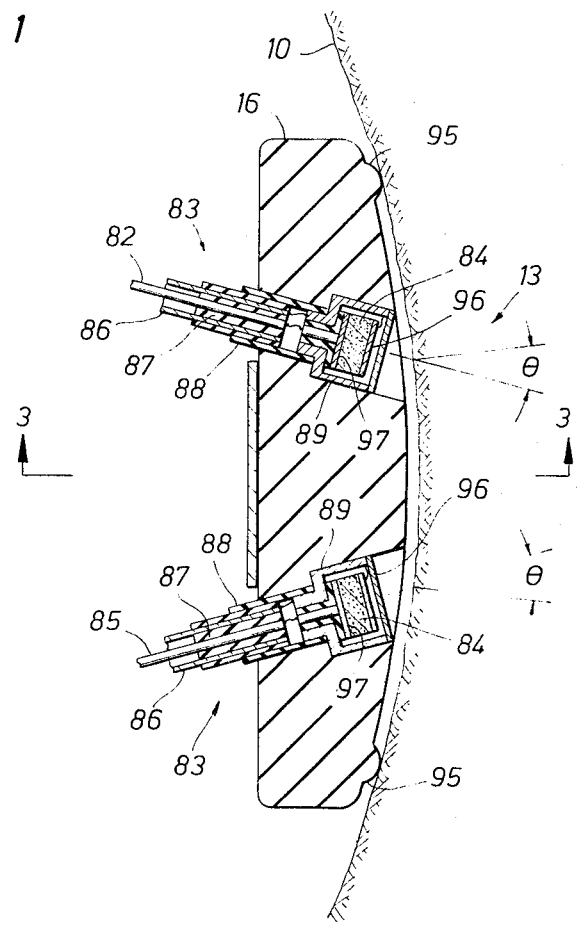
FIG. 2 is an enlarged horizontal section of the transducers and transducer mounting pad shown in FIG. 1.
Figure 3:
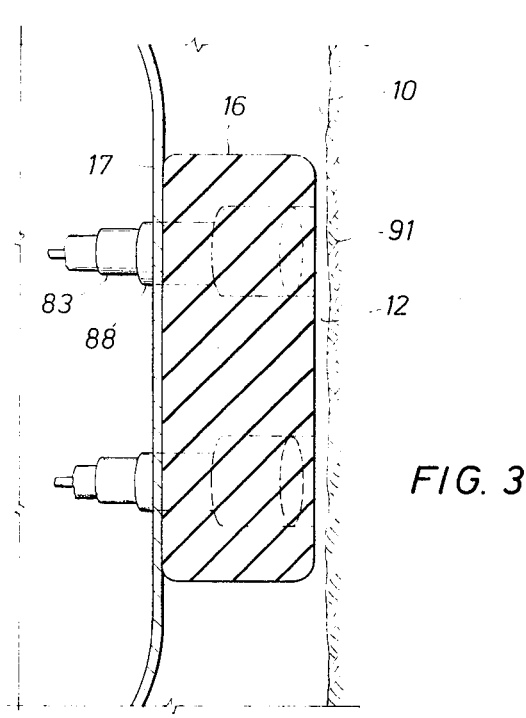
FIG. 3 is a vertical section taken along line 3—3 of FIG. 2 showing the construction of the transducer mounting pad.

Referring now to FIGS. 2 and 3 there are shown the essential details of the construction of the transducers 12 and 13 and transducer mounting pad 16. FIG. 2 shows a horizontal cross-section and FIG. 3 a vertical cross-section of the pad 16 and transducers. Since the construction and geometrical disposition of all transducers are similar, only transmitting transducers 13 of the pad are shown. The transducer mounting pad 16 is fixedly attached to the spring 17 as by molding the pad from rubber directly on the spring or in any suitable manner. The pad itself is preferably constructed of rubber or some other slightly resilient material in which the attenuation of ultrasonic waves is very high, but may be of a rigid material such as metal if the measuring circuits are designed to respond only to higher frequencies, such as 1 megacycle. The transducers preferably contain as active elements disc-shaped bodies 84 of a piezoelectric or electro-strictive material such as lead zirconium-titanate on the flat surfaces of which have been deposited metallic electrodes 96, 97, 96' and 97'. These disc-shaped bodies are preferably approximately 0.5 inches in diameter and 0.1 inch in thickness. They serve, in effect, as piston sound sources when used at a high frequency. For example, when the driving frequency is 200 kc, the wavelength in water is approximately 0.3 inch and the transmitting disc is in effect piston source with a diameter of 1.5 wavelengths. This transducer will concentrate substantially all of its energy in a beam extending 30° on either side of the axis of the transducer.

Under these conditions the transmitting transducers emit a highly directional narrow beam of plane waves of acoustic energy and the receiving transducers have corresponding narrow directional response patterns. In addition the transducers are disposed so that their axes are at an angle $\theta$ with respect to a line normal to wall of the borehole. The angle $\theta$ is chosen so that the transducers selectively excite and receive substantially only transverse or compressional waves. When the transducers are to respond substantially only to transverse waves, the angle $\theta$ should be greater than the critical angle for transverse waves. Under these conditions substantially only transverse waves will be refracted along the borehole wall. When the angle $\theta$ lies between critical angle for compressional waves and that for transverse waves substantially only compressional waves will be propagated along the wall. The transducers shown in FIG. 2 are angled to generate substantially compressional waves and the transducers for generating transverse waves will have a different angle with respect to a normal to the borehole wall. A more detailed description of the above can be found in "Introduction to the Theory of Sound Transmission" by C. B. Officer — McGraw-Hill 1958, and "The Theory of Sound" by Ragleigh — Dover Publications 1945. The angle $\theta$ should be chosen so that its sine is approximately equal to the ratio of the velocity of sound in the liquid in the borehole to the velocity of a particular type of wave in the earth formation surrounding the borehole wall. For measuring the transmission properties of rocks commonly associated with fracturing waves, this angle may be set equal to 20° for compressional waves and to 40° for transverse waves, in which case reasonably satisfactory measurements can be obtained in materials having a wide range of acoustic velocities, though in this case optimum results will be obtained when the earth formation of the borehole wall has an acoustic compressional velocity of approximately 15,000 ft. per second, and transverse velocity of 7,500 ft. per second.

The mounting pad is provided with about two parallel longitudinal ridges 95 which serve to space the pad from the borehole wall. This permits the fluid filling the borehole to circulate around the pad and reduces the noise generated as the tool is moved through the borehole. It should be noted that the transducers are spaced a short distance from the borehole wall. This insures that transducers will produce longitudinal or compressional waves in the borehole fluid. Depending upon the angle of the transducers and thus the angle at which the longitudinal waves strike the borehole wall, they will produce either longitudinal or transverse waves in formation.

The electrodes 96 and 97 of the transducers are respectively connected by solder or otherwise to respective coaxial cables 83, each comprising solid cylindrical central conductor 85, hollow cylindrical insulating member 87, hollow cylindrical conductor 86 and an outer hollow cylindrical insulating member. The transducers themselves comprise cup-like structures, preferably metallic, in which are mounted the active elements 84 which are in turn covered externally by a protective diaphragm, preferably metallic or plastic. As shown in FIG. 2, one electrode 96 of the active element 84 of the transducer is connected to the metallic transducer case and thence to the outer hollow cylindrical conductor 86, while the inner electrode 97 of the active element 84 is connected to the central cylindrical conductor 85. As shown in FIG. 2 there is preferably a clear space between the circumferential surface of the elements 84 and the containing cup-like transducer case. This space and the entire interior of the transducer case is preferably filled with some insulating liquid, such as silicone oil. Hollow cylindrical rubber boots 88 are preferably used to seal the connection between the coaxial cables 83 and the transducer case.

FIG. 3 shows a vertical cross-section vew of pad 16 taken along line 3—3 of FIG. 2. This shows that there are molded or otherwise incorporated into the pad exterior structure longitudinal ridges 95 which serve as means for holding the transducers and the pad a short distance away from the borehole wall 10 so that mud can flow between this space, thus reducing rubbing noise and minimizing the collection of mud cake which otherwise might collect excessively on the pad. Other means might be used for this purpose, such as a series of small bumps or protuberances.

Figure 4:
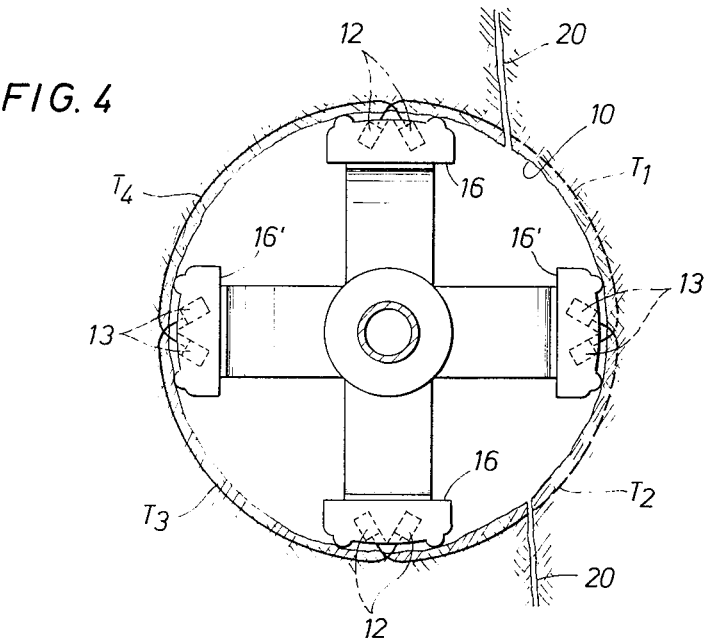
FIG. 4 illustrates the wave paths from the transmitting to the receiving transducers.

The foregoing have described in detail the use of only a single pad containing four transducers. However, the other pads used in this invention are preferably identical or similar to the one described, except that some contain receiving transducers. FIG. 4 is a schematic drawing of the arrangement of the transducers in the four pads and the paths of the waves through the formations. Only one set of transmitting transducers 12 and receiving transducers 13 are shown. The waves from the transmitting transducers travel over paths $T_1$, $T_2$, $T_3$ and $T_4$ to the receiving transducers. The waves traveling over the paths $T_1$ and $T_2$ must pass through the vertical fracture 20.

Referring now to FIG. 5, there is shown in block diagram form suitable circuits for the downhole tool described above. More particularly, there is schematically shown three of the transducer pads containing the transmitting transducers 12 and the receiving transducers 13. The transmitting transducers are all powered from a pulse generator 100 which is designed to supply a suitable electrical pulse for activating the transducers to generate pressure waves which travel through the formation to produce either compressional or transverse waves in the formation as explained above. The receiving transducers are coupled to switching amplifier circuits 101, 102, 103 and 104. Of course, the remaining receiving transducers would be coupled to similar switching amplifier circuits not shown in FIG. 5. The switching amplifiers amplify the receiver signals in part and in part eliminate them. For example, the amplifiers may amplify the first few cyles of the signal and then eliminate the remaining signal, or they may convert the variable amplitude signal to a DC signal whose amplitude varies in relation to the envelope of the signal. Suitable amplifier circuits are shown and described in the above-referenced patent application. Each of the switching amplifiers is connected to a separate peak voltage amplifier 105, 106, 107, 108, respectively. The peak voltage amplifiers produce an output that is substantially a DC voltage proportional to the peak amplitude of the corresponding receiver signal. The peak voltage amplifiers are coupled to separate conductors in a logging cable 114 for transmitting the DC signals to the surface. Of course it can be readily appreciated that less conductors can be used by multiplexing the signals onto the single cable and transmitting the multiplex signal to the surface.

Also shown in FIG. 5 is a transmitting transducer 110 and a related receiving transducer 111. The transducer 110 and its associated receiver 111 are mounted on the downhole logging tool and disposed to measure the decrease of the amplitude of the signal as it travels through the mud in the borehole. This provides a measure or an indication of the presence of gas cut mud in the borehole which will seriously decrease the amplitude of the signal received at all of the receiving transducers. For example, the transducers could be mounted on the center rod 20 of the logging tool shown in FIG. 1 in a manner similar to that used in conventional acoustic logging tools. The transmitting transducer 110 is coupled to the pulse generating circuit 100 while the receiving transducer 111 is conducted to a switching amplifier 112. The switching amplifier is connected to a peak voltage amplifier 113 whose signal is coupled to a lead in the logging cable 114. Again, it is possible to multiplex the signal from the peak voltage amplifier 113 with the signals from the previously described peak voltage amplifiers and apply the single multiplexed signal to a single conductor in a logging cable.

At the surface, all of the signals are recorded on a strip chart recorder 26 in a correlatable manner. For example, the chart can be driven by the Selsyn unit 24 in relation to the position of the logging tool in the borehole while the individual signals are recorded in a side-by-side relationship as shown by the signals 120–124. Similarly, the signals from the remaining downhole receivers could be recorded in the side-by-side relationship on the same chart. While the signals are shown as being directly recorded, it is of course possible to provide further treatment of the signals before they are recorded. For example, if a single multiplex signal is transmitted to the surface it must be demultiplexed and the individual signals recorded. Likewise, if a signal related to the envelope of the signal is transmitted to the surface, the peak amplitude of a particular portion can be measured and recorded.

Figure 6:
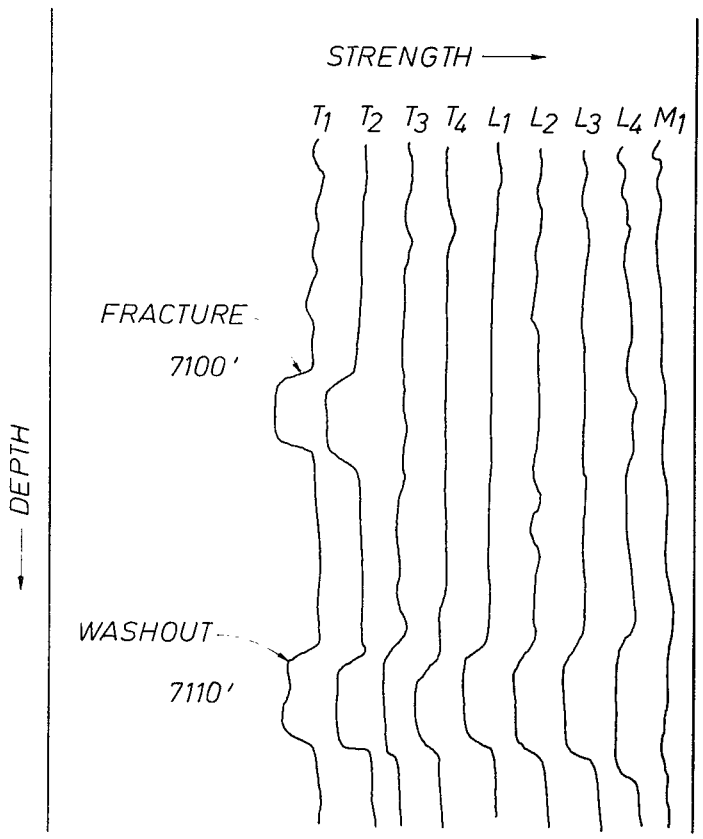
FIG. 6 shows a series of recorded signals.

Referring to FIG. 6, there is shown a portion of the record obtained from the downhole logging tool. More particularly, there is shown a recording of four traces indicated as T-1, T-2, T-3 and T-4 and four traces indicated as L-1, L-2, L-3 and L-4 and a single trace M-1. The T traces indicate the type of signal that is received from the receivers that are disposed to respond primarily to transverse waves while the L signals are those receivers that are disposed to respond primarily to longitudinal or compressional waves. The single M-1 is a signal indicating the variation in amplitude of the acoustic waves as they travel through the mud. As can be seen from the recording, a fracture is indicated at the 7,100-ft. depth interval, wherein the traces T-1 and T-2 indicate a decrease in the amplitude of the transverse waves with no corresponding decrease in amplitude in any of the remaining signals. This is the type of signal that is received for the case shown in FIG. 4. At the 7,110 ft. level there is shown the type of signals that would be received in the presence of a washout. In this case all of the signals decreased in amplitude since the signals must travel over larger distances when the pads are not pressed firmly against the borehole. The above results are obtained since the presence of a fracture will substantially eliminate or seriously decrease the transmission of transverse waves while the longitudinal waves will be transmitted with very little, if any, reduction in amplitude. This is particularly the case where the fracture is fluid-filled or filled with other material so that the compressional wave can travel with very little reduction in amplitude. The mud signal M-1 indicates that there was no gas cut mud present over the interval shown on the enclosed record. In the presence of gas cut and amplitude of the pressure waves generated by the transducers will be seriously reduced before they impinge on the formation of produce either transverse or compressional waves in the formations. Thus, the amplitudes of all signals will be reduced in the presence of gas cut mud.

From the above description of the characteristic recordings that are obtained from the signals from the downhole tool of this invention it can be appreciated that one can rapidly distinguish between the presence of a fracture in a formation and the presence of washouts or gas cut mud in a formation. In the absence of the transverse and longitudinal log signals recorded on a single record, it would be impossible to determine whether a reduction in the amplitude of the transverse waves was caused by gas cut mud, washouts or other problems with the logging tool.

I claim as my invention:

1. Apparatus for detecting the presence of fractures in a formation penetrated by a borehole, said apparatus comprising:

a logging tool adapted to be lowered into said borehole adjacent the formation;

a first pad member, said first pad member being disposed on said logging tool and biased into contact with said formation, four transmitting transducers being disposed in said first pad member to transmit acoustic waves in a horizontal plane;

a second pad member, said second pad member being disposed on said logging tool diametrically opposite said first pad member and biased into contact with said formation, four additional transmitting transducers being disposed in said second pad member to transmit acoustic waves in a horizontal plane;

third and fourth pad members, said third and fourth pad members being disposed in said logging tool midway between said first and second pad members and diametrically opposite each other, said third and fourth pad members being biased into contact with said formation, four receiving transducers being mounted on each of said third and fourth pad members, said receiving transducers receiving acoustic waves transmitted in the horizontal plane by said transmitting transducers;

circuit means coupled to said receiving transducers for in-part amplifying and in-part eliminating the receiver signals resulting from the receiving of acoustical waves; and a recording system, said circuit means being coupled to said recording system to record said amplified receiver signals in a correlatable manner in relation to the position of the logging tool in the borehole.

2. The apparatus of claim 1 wherein two of said transducers in said first and second pads are disposed to propagate substantially only transverse waves in the formation and the remaining two transducers in said first and second pads are disposed to propagate substantially only longitudinal waves in the formation, two of said transducers in said third and fourth pads are disposed to receive transverse waves and the remaining two transducers in said third and fourth pads are disposed to receive longitudinal waves.

3. The apparatus of claim 2 wherein the transducers disposed to propagate and receive transverse waves are mounted in said pads in a first horizontal plane and the transducers disposed to propagate and receive longitudinal waves are mounted in said pads in a second horizontal plane spaced from said first horizontal plane.

4. A method for detecting the presence of vertical fractures in a formation penetrated by a borehole comprising:

propagating transverse waves in the formation surrounding said borehole so that said transverse waves travel in a plane disposed at an angle to said fractures;

receiving transverse waves after they have traveled through at least a portion of the formation the borehole;

propagating longitudinal waves in the formations surrounding said borehole so that said longitudinal waves travel in a plane disposed at an an angle to said fractures;

receiving said longitudinal waves after they have traveled through at least a portion of the formation surrounding the boreholes; and recording signals related to the amplitude of all of the received waves in a side-by-side relationship.

5. The method of claim 4 wherein said transverse and longitudinal waves are propagated at a plurality of locations to produce contiguous paths around the borehole for both said transverse and longitudinal waves.

6. The method of claim 4 and, in addition, producing and receiving longitudinal waves that travel primarily through the fluid, filling the borehole and recording a signal related to the amplitude of the received wave in a side-by-side relationship to said previously-recorded signals.

7. The method of claim 4 wherein signal related to the peak amplitude of the received waves are recorded.

8. The method of claim 4 wherein the transverse and longitudinal waves are propagated at a first position and received at a second position disposed in the same plant as the plane in which said transverse and longitudinal waves are propagated.

9. The method of claim 8 wherein both said transverse and longitudinal waves are produced at first and second position spaced substantially laterally and diametrically opposite each other, both said transverse and longitudinal waves being received at first and second position spaced laterally and diametrically opposite each other.

10. The method of claim 4 wherein signals related to the peak amplitude of the received waves are recorded.

* * * * *